(12) United States Patent
Vandike et al.

(10) Patent No.: US 11,013,175 B2
(45) Date of Patent: May 25, 2021

(54) GRAIN LOSS APPARATUS FOR A GRAIN HARVESTING VEHICLE

(71) Applicant: Deere & Company, Moline, IL (US)

(72) Inventors: Nathan R. Vandike, Geneseo, IL (US); Adam J. Donohoe, Bettendorf, IA (US); Michael T. Meschke, Eldridge, IA (US); Jody I. Eyestone, Milan, IL (US); Jeremiah K. Johnson, Long Grove, IA (US); Jeffrey R. Walter, Bettendorf, IA (US); Matthew T. Wold, Coal Valley, IL (US); Brian Gorge, Colona, IL (US)

(73) Assignee: DEERE & COMPANY, Moline, IL (US)

( * ) Notice: Subject to any disclaimer, the term of this patent is extended or adjusted under 35 U.S.C. 154(b) by 289 days.

(21) Appl. No.: 16/046,620

(22) Filed: Jul. 26, 2018

(65) Prior Publication Data

US 2020/0029498 A1 Jan. 30, 2020

(51) Int. Cl.
*A01D 41/127* (2006.01)
*A01F 12/44* (2006.01)

(52) U.S. Cl.
CPC ....... *A01D 41/1273* (2013.01); *A01D 41/127* (2013.01); *A01D 41/1276* (2013.01); *A01F 12/444* (2013.01); *A01F 12/446* (2013.01)

(58) Field of Classification Search
CPC .............. A01D 41/127; A01D 41/1272; A01D 41/1273; A01D 41/1276; A01D 12/446; A01F 12/444; A01F 12/446; A01F 12/448

(Continued)

(56) References Cited

U.S. PATENT DOCUMENTS

| 2,253,296 A | 8/1941 | Holtzman |
| 2,781,097 A * | 2/1957 | Nold ..................... A01F 12/446 |
| | | 72/326 |

(Continued)

FOREIGN PATENT DOCUMENTS

| BE | 761020 A | 5/1971 |
| EP | 2550851 A1 | 1/2013 |
| GB | 1261235 A | 1/1972 |

OTHER PUBLICATIONS

Claas, "TUCANO 300 CLAAS Threshing System / 2016," <https://www.youtube.com/watch?v=pkF_jXzdL-Y> publically available at least as early as Aug. 12, 2016.

(Continued)

*Primary Examiner* — Adam J Behrens
(74) *Attorney, Agent, or Firm* — Michael Best & Friedrich LLP (57) ABSTRACT

A grain harvesting vehicle is configured to harvest a grain. A chaffer is configured to separate grain from material other than grain (MOG). A grate is positioned rearward of the chaffer. The grate includes a grate panel having an upper surface and a lower surface and an aperture in the grate panel extending between the upper surface and the lower surface. The aperture has a first end nearer the chaffer and a second end opposite the first end. The grate further includes a ramp portion extending above the grate panel from adjacent the first end of the aperture toward the second end of the aperture. A grain sensor has a sensing location positioned at a height below the grate.

19 Claims, 7 Drawing Sheets

(58) Field of Classification Search
USPC ........ 56/10.2 C, 10.2 R; 209/394; 460/5, 72, 460/101, 109
See application file for complete search history.

(56) References Cited

U.S. PATENT DOCUMENTS

| | | | | |
|---|---|---|---|---|
| 3,638,659 | A * | 2/1972 | Dahlquist | A01D 41/1273 460/1 |
| 4,036,065 | A * | 7/1977 | Strelioff | A01D 41/1273 73/865.9 |
| 4,230,130 | A * | 10/1980 | Staiert | A01D 41/1273 460/5 |
| 4,517,792 | A * | 5/1985 | Denning | A01D 41/1273 460/5 |
| 5,176,574 | A * | 1/1993 | Matousek | A01F 12/446 209/394 |
| 5,312,299 | A * | 5/1994 | Behnke | G01F 1/666 460/5 |
| 5,466,190 | A | 11/1995 | Skinner et al. | |
| 5,588,912 | A * | 12/1996 | Schumacher, II | A01F 12/446 460/101 |
| 6,379,243 | B1 * | 4/2002 | Schumacher | A01F 12/446 209/394 |
| 6,869,355 | B2 | 3/2005 | Bernhardt et al. | |
| 7,362,233 | B2 * | 4/2008 | Behnke | A01D 41/1276 340/684 |
| 9,474,208 | B2 * | 10/2016 | Batcheller | A01D 41/1275 |
| 9,631,964 | B2 * | 4/2017 | Gelinske | G01F 1/662 |
| 10,334,781 | B2 * | 7/2019 | Reinecke | A01F 12/448 |
| 2003/0140612 | A1 * | 7/2003 | Gorden | A01F 12/446 56/100 |
| 2004/0224736 | A1 | 11/2004 | Grywacheski et al. | |
| 2004/0259610 | A1 * | 12/2004 | Behnke | A01D 41/127 460/59 |
| 2007/0062288 | A1 * | 3/2007 | Behnke | A01D 41/1273 73/587 |
| 2007/0089389 | A1 * | 4/2007 | Baumgarten | A01D 41/1276 56/10.2 A |
| 2015/0080070 | A1 | 3/2015 | Johnson et al. | |
| 2019/0150361 | A1 * | 5/2019 | Aesaert | A01F 12/448 |

OTHER PUBLICATIONS

Gleaner, "2017 S9 Series Combines & Headers Brochure," <http://www.gleanercombines.com/content/dam/Brands/Gleaner/US/pdf/literature-brochures/gleaner-s9-series-combines-brochure-my2017-GL16B001ST.pdf/_jcr_content/renditions/original> publically available at least as early as Dec. 7, 2017.

Massey Fergusion, "9505 Series Combines Brochure," <http://www.masseyferguson.us/content/dam/Brands/Massey%20Ferguson/US/Literature/massey-ferguson-9505-series-combines-brochure-english.pdf/_jcr_content/renditions/original> publically available at least as early as Feb. 28, 2017.

European Search Report issued in counterpart European Patent Application No. 19185936.2 dated Dec. 17, 2019 (6 pages).

* cited by examiner

GRAIN LOSS APPARATUS FOR A GRAIN HARVESTING VEHICLE

BACKGROUND

The present disclosure relates to a grain harvesting system and more particularly to a system and method for measuring grain loss within the grain harvesting system.

SUMMARY

The invention provides, in one embodiment, a grain harvesting vehicle configured to harvest a grain. A chaffer is configured to separate grain from material other than grain (MOG). A grate is positioned rearward of the chaffer. The grate includes a grate panel having an upper surface and a lower surface and an aperture in the grate panel extending between the upper surface and the lower surface. The aperture has a first end nearer the chaffer and a second end opposite the first end. The grate further includes a ramp portion extending above the grate panel from adjacent the first end of the aperture toward the second end of the aperture. A grain sensor has a sensing location positioned at a height below the grate.

The invention provides, in another embodiment, a method of determining grain loss within a grain harvesting vehicle. A first amount of grain is separated from a material other than grain (MOG) via a chaffer. A second amount of grain passes over the chaffer without separating from the MOG. A grate having an aperture in a grate panel is positioned rearward of the chaffer. The aperture is at least partially defined by a first ramp portion extending above the grate panel. The MOG is deflected over the first ramp portion and away from the one or more apertures. The at least some of the second amount of grain is directed through the aperture. The at least some of the second amount of grain is directed to a sensing location of a grain sensor.

The invention provides, in yet another embodiment, a grain loss apparatus for a grain harvesting vehicle. The grain loss apparatus includes a grate comprising a grate panel extending from a first end coupled to a chaffer to a second end, and an aperture at least partially defined by a ramp portion extending upward from the grate panel toward the second end of the grate panel. A material other than grain (MOG) path is defined from the first end, over the ramp portion, and to the second end. A grain path is defined from the first end and through the aperture.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
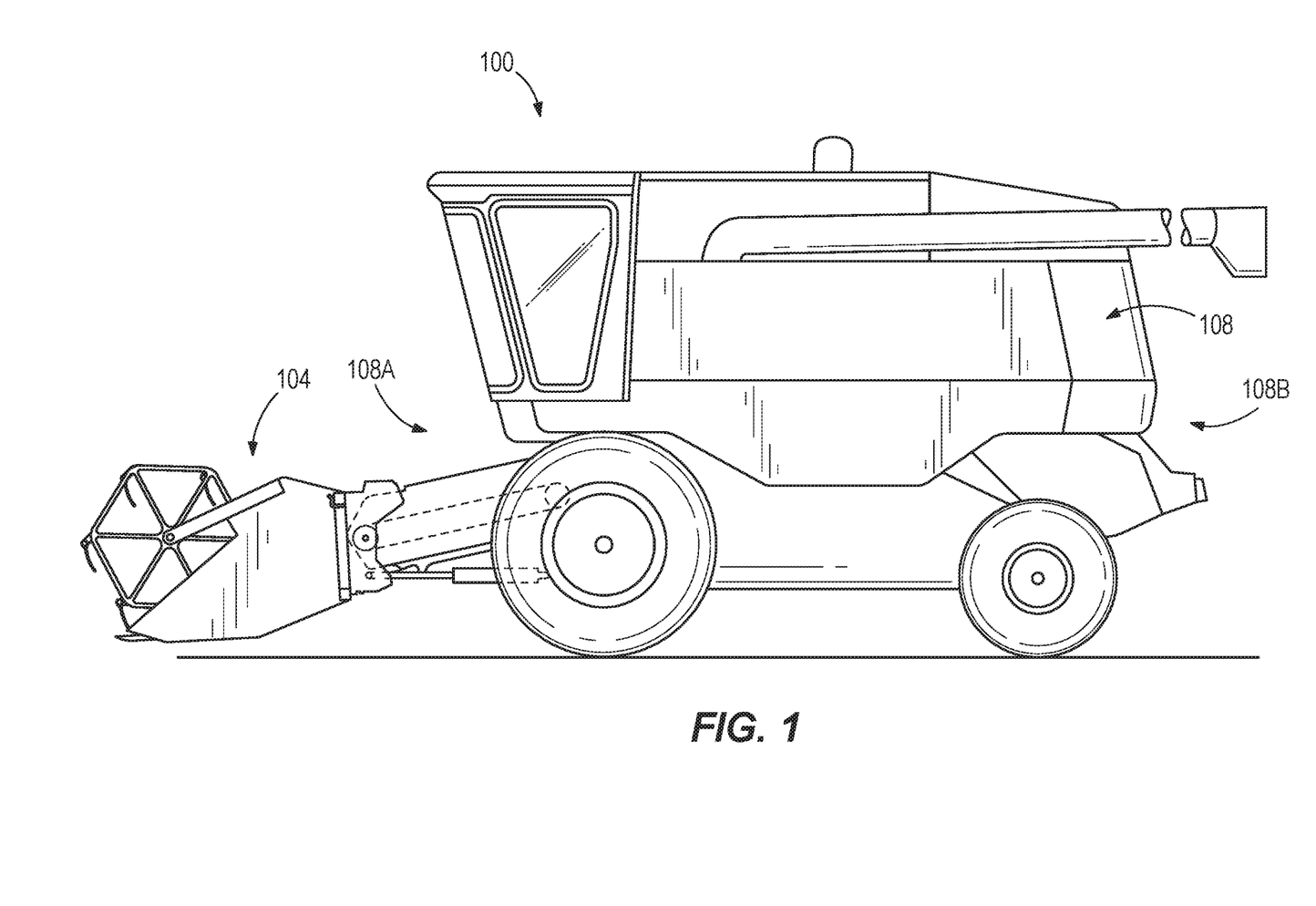
FIG. 1 is a side view of a grain harvesting vehicle.
Figure 2:
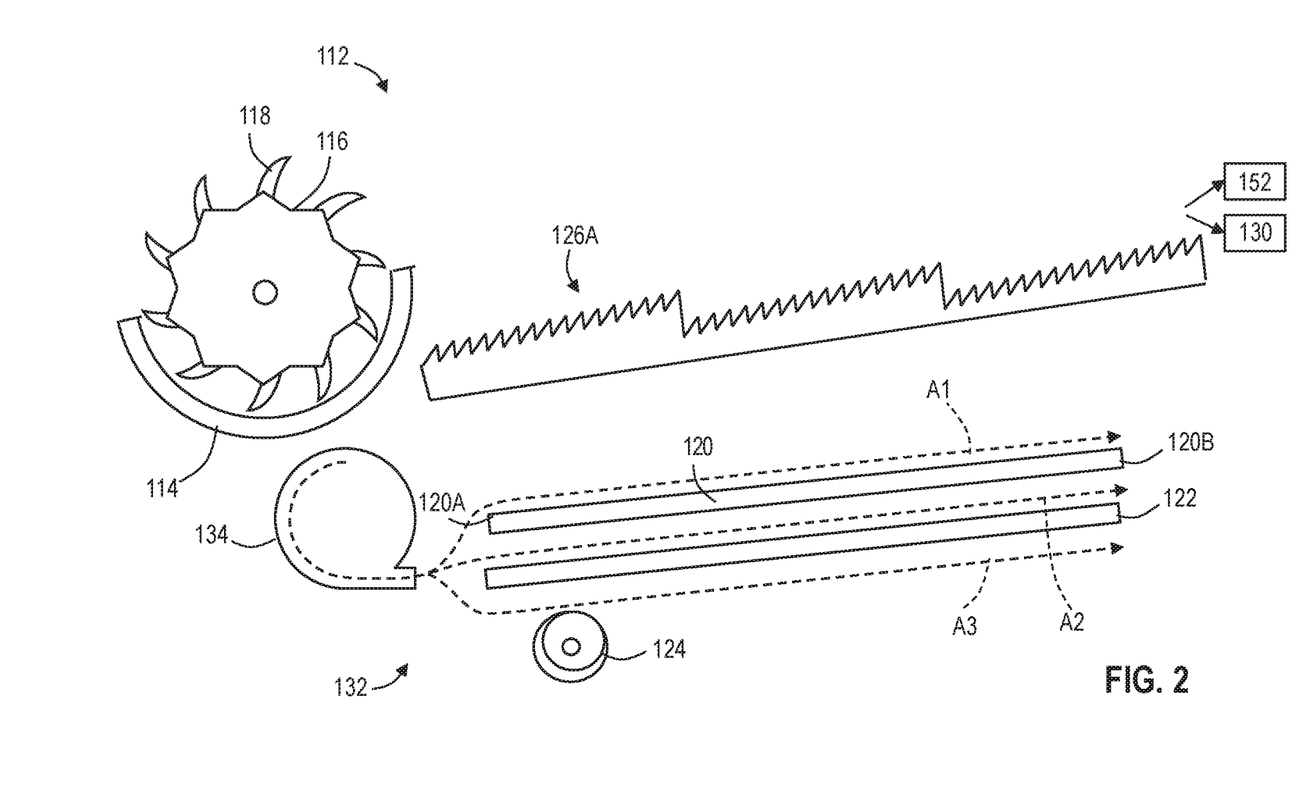
FIG. 2 is a schematic view of systems within the grain harvesting vehicle for separating the grain from the material other than grain.

Grain harvesting vehicles 100 such as combine harvesters reap crops such as wheat/oats, rye, barley, corn and the like. Reaping of crops is carried out by various heads or header assemblies 104 that may be removable and replaceable from the front 108A of the body 108 of the vehicle 100 when switching between the harvesting of different crops. A rear 108B of the body 108 of the vehicle 100 is opposite the front 108A. The header 104 cuts and/or gathers the grain from the field, although the gathered grain is accompanied by material other than grain (MOG) such as straw and chaff. Therefore, the grain harvesting vehicle 100 is provided with a number of systems 112 for separating the grain from the MOG so that the grain is collected in a grain tank and the MOG is discarded. The first such system is the threshing cylinder 116. The header 104 feeds the grain and MOG to the threshing cylinder 116. The threshing cylinder 116 includes rasp bars 118 that separate the grain and chaff from a majority of the straw, moving the straw to a straw walker 126A, and eventually to the rear 108B of the vehicle 100 where the straw is discarded to the environment by a straw chopper 130 or windrowing system 152. Grain in the straw walker 126A passes through openings in the straw walker 126A and falls to the upper and lower sieves 120, 122.

Additionally, the grain, chaff, and some straw within the threshing cylinder 116 passes through openings in a concave 114 and to a cleaning shoe 132 having a plurality of chaffers or sieves (e.g., the upper sieve or chaffer 120, the lower sieve 122). The sieves 120, 122 include adjustable fingers that permit material below a specific size, such as the grain, to fall therethrough. The grain falls through the chaffers and to a collection area where the grain is transported to the grain tank (e.g., via an auger 124). The MOG on the sieves 120, 122 is too large to fall to the collection area and is therefore carried off the rear of the sieves 120, 122 via an airflow A1, A2 from a fan 134 over the respective sieve 120, 122 and/or via a rhythmic and repetitive oscillating motion of the sieve 120, 122 directing the MOG to the rear of the sieve 120, 122. However, there may be grain loss along the sieves 120, 122 within the grain harvesting vehicle 100 if grain does not fall through the chaffer 120 and instead is carried to the rear of the chaffer 120. The chaffer 120 is unable to separate all of the grain from the MOG in the chaffer 120 for example, if the cleaning shoe 132 is overloaded with product, then not all of the product will fall through the chaffer 120. Additionally, if the angles of the louvers of the chaffer 120 are set at an inadequate angle, not all of the grain will fall through. Further still, if the airspeed from the fan 134 is too high, it can move the product past the chaffer 120 too quickly.

It is beneficial to measure the grain loss at the rear of the chaffer 120 in real time so that the operator can make live adjustments to fan speed, grain feed rate, and/or an angle or speed of the chaffer 120 to limit grain loss. Further, the information can be forwarded to a controller 48 for various systems on the combine harvester 100 to automatically adjust such settings.

Figure 3:
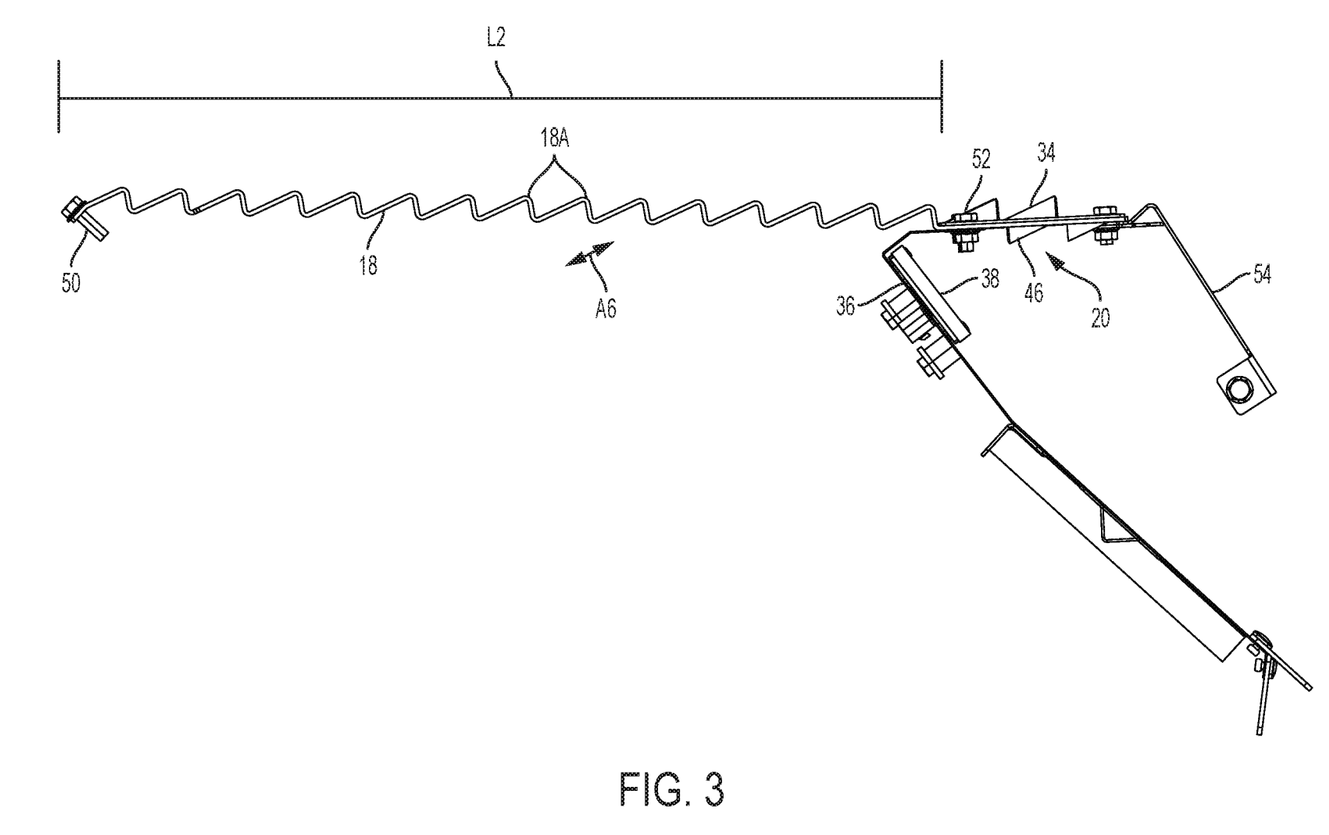
FIG. 3 is a side view of a grain separating system, including a step pan, a grate, and a grain sensor.

Unless otherwise specified, with respect to the contents of this application, the term "lost grain" refers to the grain that does not fall through the chaffer 120 to the collection area (at the auger 124), and is instead carried off of the rear of the chaffer 120 to the step pan 18 and grate 20 as described below. It is to be understood that this lost grain may be discarded to the environment with the MOG or may otherwise enter a secondary collection in which the grain is eventually separated from the MOG and transferred to a storage tank (and is therefore not "lost" in the traditional sense).

The upper sieve or chaffer 120 oscillates via a drive apparatus (e.g., a motor, a piston, etc.) to move material along the length of the chaffer 120 from a front end 120A toward a rear end 120B. A step pan 18 is fastened at the rear end 120B of the chaffer 120 (e.g., via a threaded fastener 50) such that material that continues off the rear end 120B of the chaffer 120 is transferred to the step pan 18. The step pan 18 includes ridges 18A spaced apart along the length L2 of the step pan 18 similar to the ridges of the chaffer. However, unlike, the chaffer 120, the step pan 18 does not have any apertures extending therethrough for the separation of grain from MOG. Rather, the step pan 18 directs the MOG and remaining grain to a grate or grid 20.

As shown in FIGS. 3-7, the grate 20 is positioned at the rear of the step pan 18 (or may be formed integrally with the step pan 18) to direct the grain 14 toward a grain impinging surface 38 of a grain sensor 36. The grate 20 is a generally planar panel 22 having a length L1, a width W1 perpendicular to the length L1, and a thickness T1 perpendicular to the length L1 and width W1. The width W1 is greater than the length L1 and the length L1 is greater than the thickness T1. The length L1 of the grate is parallel with the flow direction of the grain and MOG from the upstream chaffer 120 and extends from a front side 42 to a rear side 44.

Figure 4:
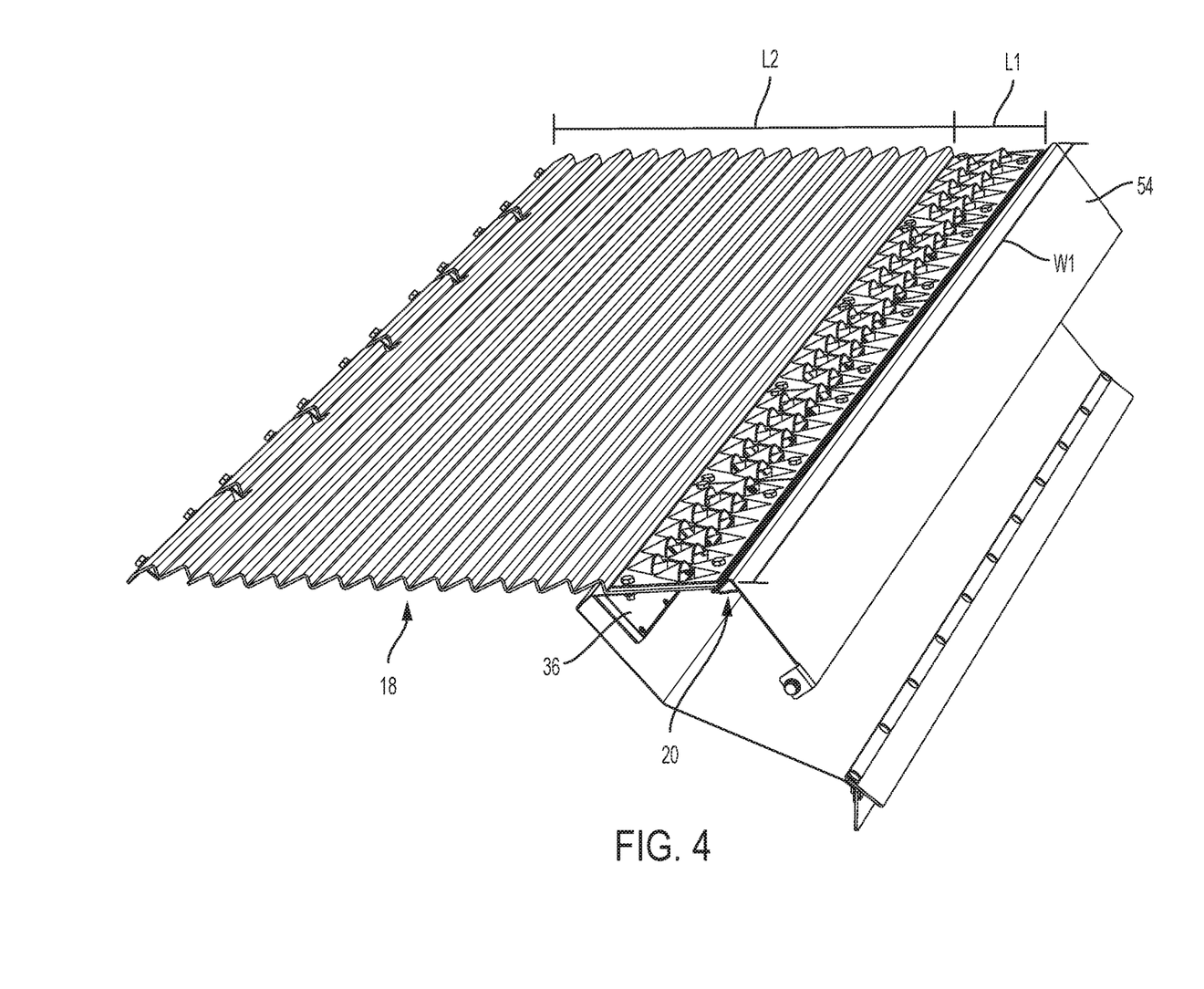
FIG. 4 is a perspective view of the grain separating system of FIG. 3.

The grate 20 may be attached to the step pan by fasteners 52 and therefore movable with the step pan 18. Alternatively, the grate 20 may be separated from the step pan 18 and chaffer 120 and may be otherwise controlled by a secondary system such that the motion of the grate 20 can vary relative to the motion of the step pan 18.

Figure 5:
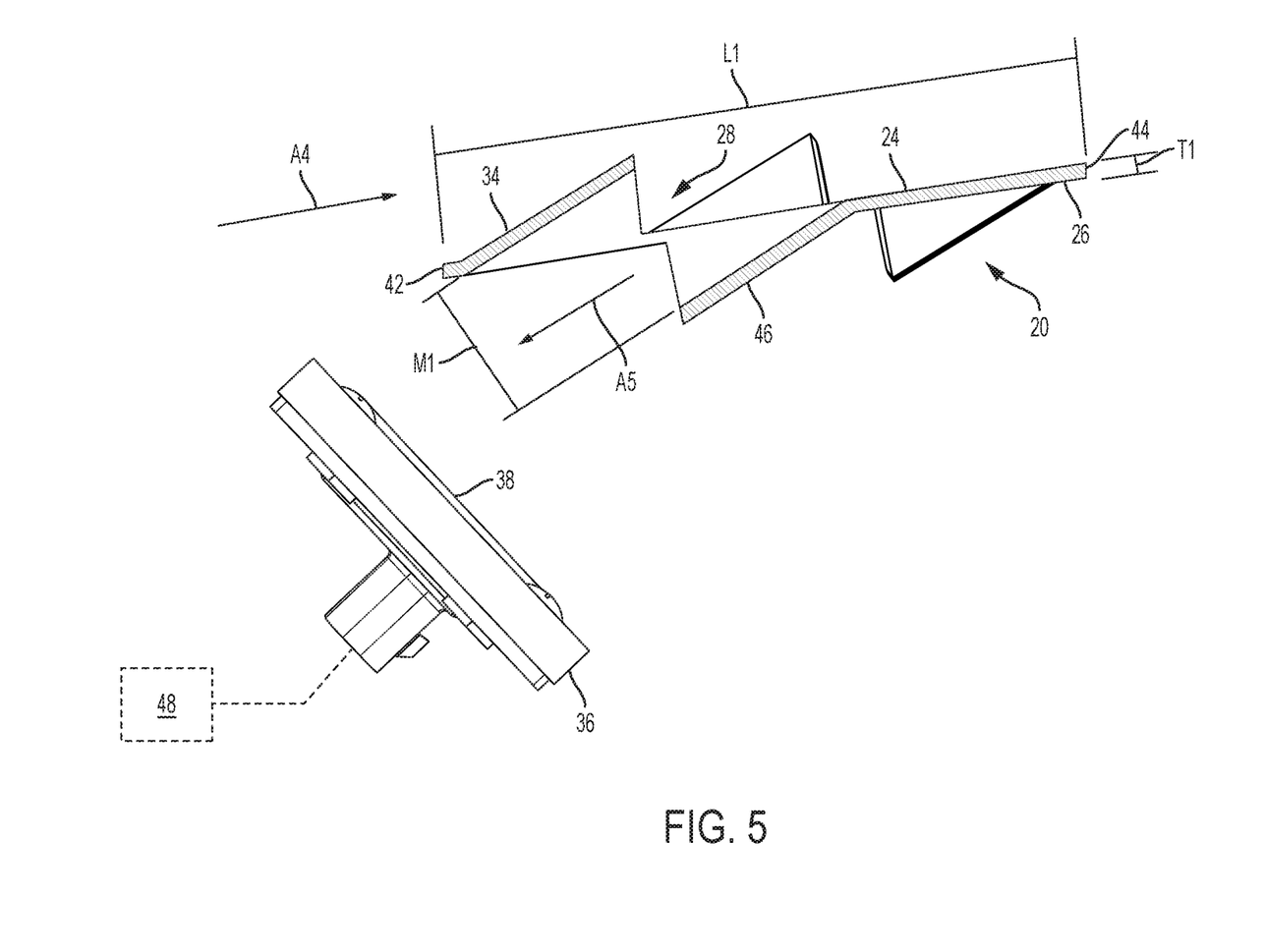
FIG. 5 is a cross-sectional side view of the grate and grain sensor of FIG. 3.
Figure 6:
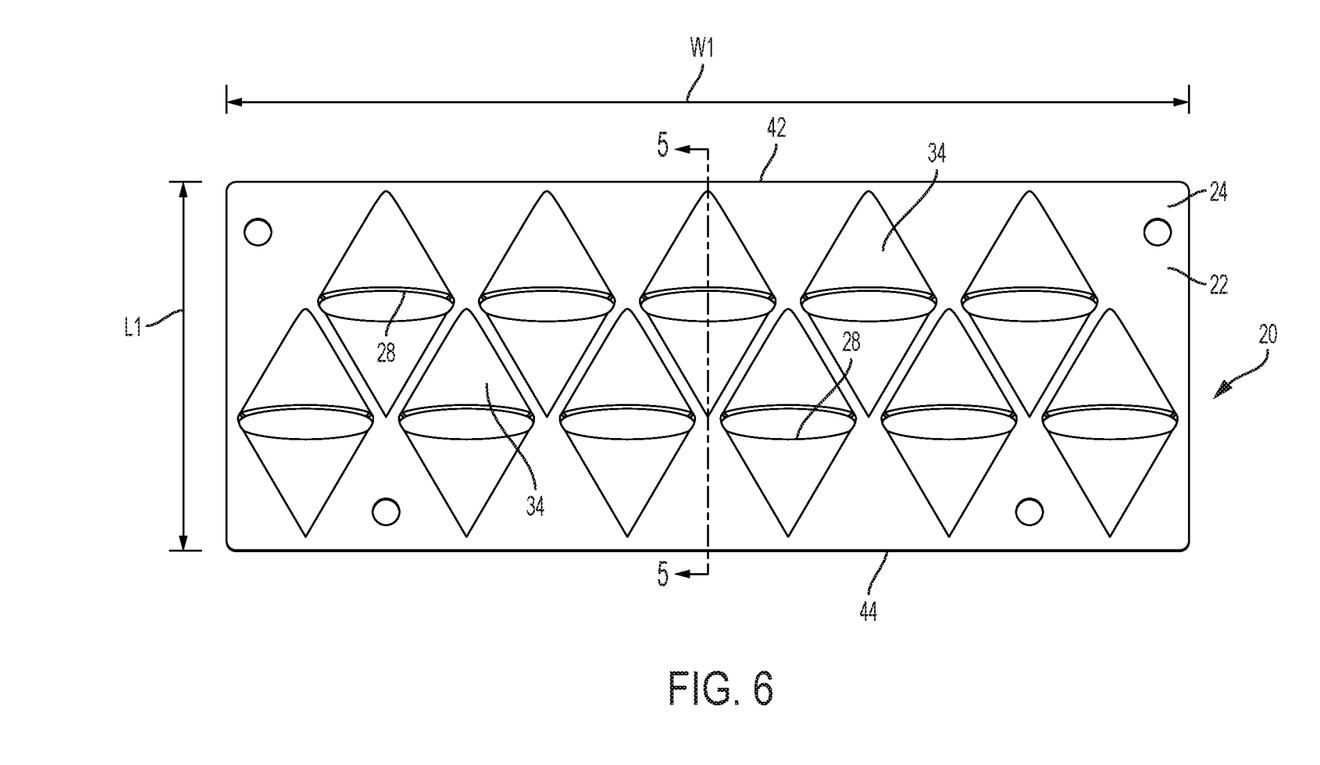
FIG. 6 is a top view of the grate of FIG. 3.
Figure 7:
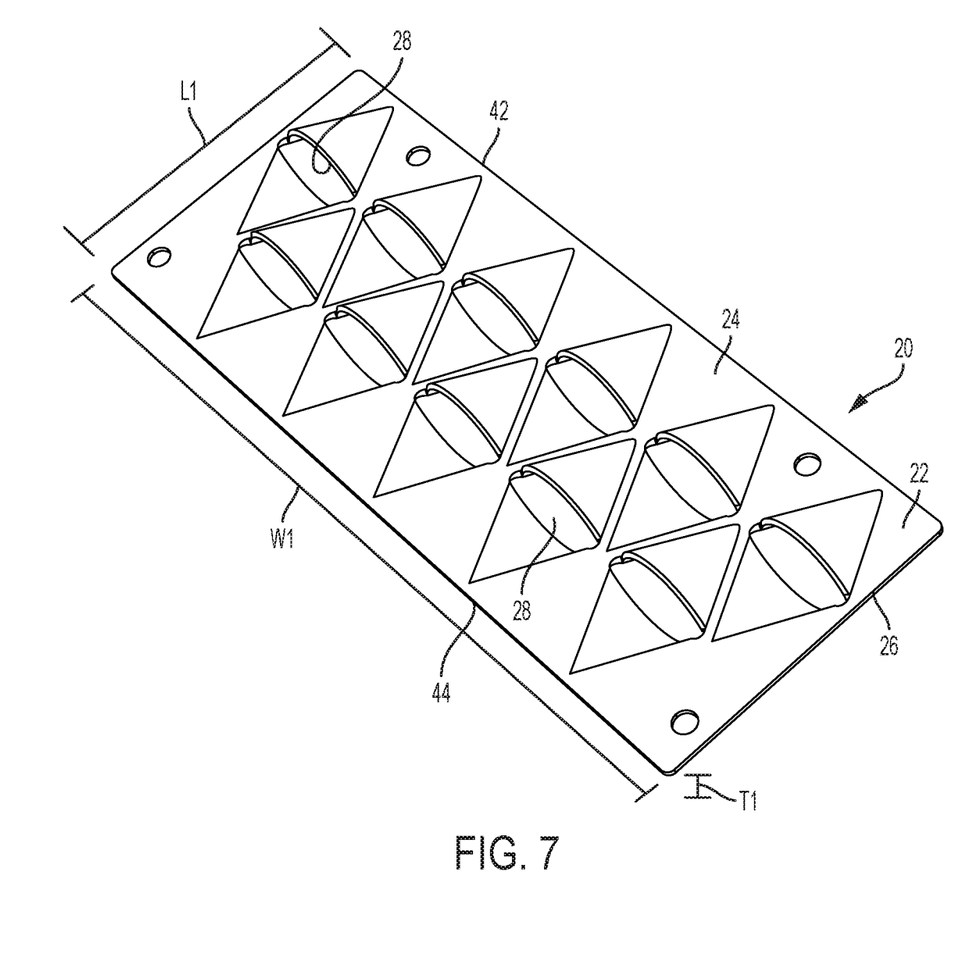
FIG. 7 is a perspective view of the grate of FIG. 3.

As shown in FIGS. 5-7, the grate 20 may comprise a plurality of individual grate panels 22 positioned next to one another that collectively define the grate 20. The grate 20 includes apertures 28 extending through the thickness T1 of the panel 22 from an upper surface 24 to a lower surface 26 to define a passageway through the grate 20. Each aperture may have a width of, for example, forty to sixty millimeters.

With continued reference to FIGS. 5-7, a hollow semi-conical ramp 34 is positioned between the front side 42 of the grate 20 and each aperture 28. The ramp portion 34 begins at a point on the upper surface 24 of the grate 20 and increases in width and height in the lengthwise direction (i.e., in the direction of the length L1 of the grate 20) toward the rear side 44 of the grate 20. The ramp portion 34 is hollow, and may have a thickness similar to or less than the thickness T1 of the grate 20.

A similar ramp portion 46 is mirrored on the rear side of the aperture 28 on the lower surface 26 of the grate 20 to form a lower cupped ramp 46. Therefore, the lower cupped ramp 46 is similar in shape and size to the ramp portion 34, except as otherwise described.

Therefore, the aperture 28, when viewed from above (in a plane perpendicular to the thickness T1 of the grate 20 as shown in FIG. 6) appears elliptical. However, the size of the aperture is substantially larger due to the path provided by the hollow ramp portions 34, 46 of the grate 20. As shown in FIG. 5, the aperture 28 has a cylindrical shape at least partially defined by the ramp portions 34, 46. The cylindrical shape defines a channel that extends through the thickness T1 of the grate 20 at an angle parallel to the rise of the ramp portions 34, 46 (e.g., at a 20-30 degree angle relative to the plane of the planar panel 22). As an alternative, the aperture 28 (and/or related ramp portions 34, 46) may have a different shape, such as a rectangular shape, a triangular shape, or a circular shape, that may provide a different percent open area for engaging the material and accepting the grain. For example, utilizing a wide rectangular aperture as opposed to the elliptical opening shown may provide a larger open area to engage a greater percentage of the material.

The grate 20 includes a plurality of the apertures 28 positioned adjacent to one another, as shown in FIG. 6. Therefore, the panel 22 defines a circuitous path between the ramps 34, 36 and apertures 28 in the lengthwise direction to eliminate straight paths in the lengthwise direction along which grain could bypass the apertures.

The increasing shape of the ramp 34 (from the front side 42 toward the rear side 44) directs the lighter materials (the chaff and straw; the MOG) away from or over the apertures 28, while the heavier grain is collected within the recessed pockets defined by the hollow and cupped ramp portion 46.

A plurality of grain sensors 36 (e.g., a pressure sensor, a force sensor, a vision-based sensor such as a camera system, a contact sensor, a radio frequency sensor, etc.) are positioned below the grate 20. Each sensor 36 includes a sensing location at which the grain that falls through the aperture 28 is sensed. For contact-type sensors (such as pressure sensors, force sensors, and some vision-based sensors), the sensing location is at least one grain impingement surface 38 that measures the impact of a grain. For non-contact sensors (such as some vision-based sensors and radio frequency sensors), the sensing location is the location at which the sensor measures or recognizes the presence of the grain. For example, a camera or radio frequency sensor may be directional to record grain passing by a certain location within the range of the sensor. In this scenario, the sensing location includes the range of the sensor. As a further alternative, each sensor 36 may include a system of vision-based sensors or radio frequency sensors directed toward one another to measure or record the grains falling therebetween. In this scenario, the sensing location includes the locations measured and recorded between the sensors. In these non-contact scenarios, the direction of grain, as directed by the lower ramps 46 may be orthogonal to the sensing orientation of the sensors.

Each grain sensor is arranged below the grate 20 in a position such that grains falling through one or more of the apertures 28 in the grate 20 contact the impingement surface 38. More specifically, the sensors 36 are angled such that as the grain falls through the apertures 28 along the hollow lower ramp 46, the grain impinges directly into the impingement surface 38. Written another way, the grain impingement surface 38 is generally planar. The sensor 36 is positioned such that the grain impinges perpendicular to the plane of the impingement surface 38 so the force or pressure measured by the sensor 36 is provided normal to the impingement surface 38.

The hollow lower ramp 46 defines a grain path through the grate 20, as shown by arrow A5. The lower ramp 46 extends linearly down from the grate panel 22 at an angle relative to the length L1 of the grate panel 22, as shown in FIG. 5, of approximately twenty to thirty degrees from the grate panel 22 toward the front side 42 of the grate 20. However, other angles (e.g., between 10 and 45 degrees, between 15 and 35 degrees, between 20 and 25 degrees) may be utilized. The angle of the lower ramp 46 and the angle of the impingement surface 38 may be complementary angles, or may be offset from being complimentary angles by a small offset (e.g., 5 degrees, 10 degrees) to account for gravity and component placement.

In order to ensure that the MOG is not being pulled through the apertures 28 in the grate 20 toward the sensor 36, the geometry of the apertures 28 in the grate creates a neutral or positive airflow through the grate apertures 28 from below. For redundancy or a backup, a duct (as indicated by one or both of arrows A2, A3 in FIG. 2) from the cleaning shoe 132 may direct airflow directly to the underside of the grate apertures 28 to ensure a positive airflow therethrough.

In closed tailboard vehicles, a chopper (not shown) is positioned behind and below the rear 44 of the grate 20. The chopper intakes the MOG from the grate 20 as well as the straw walker 126A and chops the MOG and spreads the chopped MOG throughout the field outside the vehicle 100. The grain that impinges off of the grain sensor 36 likewise is directed to the chopper where it is spread to the field. Alternatively, a recovery system may gather the grain that impinges off of the grain sensor for re-sifting and/or conveyance to a grain storage tank.

A shield 54 is positioned at the rear 44 of the grate 20, extending downward from the grate 20. The shield 54 prevents kickback of husks or rocks from ricocheting off of the blades of the chopper and damaging the sensor 36. Such a shield 54 is therefore more relevant to combine harvesters 100 having a chopper, such as closed tailboard vehicles.

In operation, grain and MOG is provided to the upper sieve or chaffer 120 where a majority of the MOG (not previously separated via the threshing cylinder 116) is separated from the grain, and the grain is moved successfully to the collection area (at the auger 124). The chaffer 120 oscillates to stratify and separate the grain from the MOG, and an airflow A1 (in combination with the shaking motion) moves the MOG and any remaining grain along the length of the chaffer 120 to further openings along the chaffer 120 until the remaining material on the chaffer 120 is mainly comprised of MOG. The airflow A1 and oscillation of the chaffer 120 moves the remaining material off of the rear 120B of the chaffer 120 and onto the step pan 18. The step pan 18 conveys the material along an upper surface with continued oscillating motion to stratify the grain from the MOG, separating the heavier, smaller grain such that it settles within the steps 18A, while the larger MOG primarily passes over the crests of the steps 18A. The step pan 18 conveys the material to the grate 20 by shaking or agitating in a diagonal direction (up-right and down-left, according to the orientation of FIG. 3 and as shown by arrow A6) with the chaffer 120 to stratify the grain.

Once at the grate 20, the grate oscillates in a direction that is generally parallel with the angle of the ramps 34, 46 between a first position and a second position. The MOG passes over and around the apertures 28, directed away from the apertures 28 by the semi-conical ramps 34. Once the MOG has traversed past the ramps 34, it falls off the back of the grate 20 and to the chopper, where it is cut and spread to the field.

On the other hand, once the grain reaches the grate 20, it settles within the lower cupped ramp 46 based on the weight and size of the grain and the continued stratification of the grain caused by the oscillating motion of the grate 20. The grain then continues along the grain path A5 described above, extending down the lower cupped ramp 46, under the upper ramp 34, until the grain contacts the impingement surface 38 of the grain sensor 36. The contact of the grain against the sensor 36 generates an electrical signal that is analyzed by a controller 48 and/or an operator to provide real-time feedback of the efficiency of the chaffer 120.

Various features of the disclosure are set forth in the following claims.

What is claimed is:

1. A grain harvesting vehicle configured to harvest a grain, the grain harvesting vehicle comprising:
    a chaffer configured to separate grain from material other than grain (MOG);
    a grate positioned rearward of the chaffer, the grate comprising:
        a grate panel having an upper surface and a lower surface;
        an aperture in the grate panel extending between the upper surface and the lower surface, the aperture having a first end nearer the chaffer and a second end opposite the first end; and
        a ramp portion extending above the grate panel from adjacent the first end of the aperture toward the second end of the aperture; and
    a grain sensor having a sensing location positioned at a height below the grate,
    wherein the ramp portion is a hollow semi-conical ramp.

2. The grain harvesting vehicle of claim 1, wherein the ramp portion is a first ramp portion, and wherein the grate further includes a second ramp portion extending below the grate panel from adjacent the second end of the aperture toward the first end of the aperture.

3. The grain harvesting vehicle of claim 2, wherein the sensing location is a grain impinging surface and is substantially perpendicular to the ramp portion.

4. The grain harvesting vehicle of claim 2, wherein the first ramp portion is mirrored relative to the second ramp portion.

5. The grain harvesting vehicle of claim 2, wherein the aperture is at least partially defined by the first ramp portion and the second ramp portion.

6. The grain harvesting vehicle of claim 1, further comprising a shield positioned at a rear of the grate and extending downward from the grate.

7. The grain harvesting vehicle of claim 1, further comprising a step pan fastened to the chaffer such that motion of the chaffer is transmittable to the step pan, and wherein the grate is fastened to the step pan such that motion of the chaffer is transmittable to the grate.

8. A method of determining grain loss within a grain harvesting vehicle, wherein a first amount of grain is separated from a material other than grain (MOG) via a chaffer, and wherein a second amount of grain passes over the chaffer without separating from the MOG, the method comprising:
    positioning a grate having an aperture in a grate panel rearward of the chaffer, the aperture at least partially defined by a first ramp portion extending above the grate panel;
    deflecting the MOG over the first ramp portion, away from the aperture and to an environment external to the grain harvesting vehicle;
    directing at least some of the second amount of grain through the aperture; and
    directing the at least some of the second amount of grain to a sensing location of a grain sensor and from the grain sensor to the environment.

9. The method of claim 8, wherein the sensing location is an impinging surface of the grain sensor, and wherein the at least some of the second amount of grain impinges substantially perpendicular to the impinging surface of the grain sensor.

10. The method of claim 8, further comprising:
moving the MOG and the second amount of grain along a step pan; and
separating at least some of the second amount of grain from the MOG within the step pan,
wherein moving the MOG and the second amount of grain and separating at least some of the second amount of grain from the MOG includes agitating the step pan.

11. The method of claim 8, wherein moving the MOG and the second amount of grain and separating at least some of the second amount of grain from the MOG includes generating an airflow from a fan.

12. The method of claim 8, wherein a second ramp portion extends below the grate panel to at least partially define the aperture, wherein the second ramp portion directs the at least some of the second amount of grain to the sensing location.

13. The method of claim 8, further comprising shielding the grain sensor at a position rearward of the grate.

14. A grain loss apparatus for a grain harvesting vehicle, the grain loss apparatus comprising:
a grate comprising a grate panel having a length extending from a first end coupled to a chaffer to a second end, the grate having a width perpendicular to the length, the grate comprising a plurality of apertures, each aperture of the plurality of apertures at least partially defined by a ramp portion extending upward from the grate panel toward the second end of the grate panel, the ramp portions being distinct and spaced apart from one another along the width;
wherein a material other than grain (MOG) path is defined from the first end, over the ramp portions, and to the second end, and
wherein a grain path is defined from the first end and through the plurality of apertures.

15. The grain loss apparatus of claim 14, further comprising a grain sensor having a sensing location positioned at a height below the grate.

16. The grain loss apparatus of claim 14, further comprising a drive apparatus operable to shake the grate between a first position and a second position in a direction that is substantially parallel to an angle of the ramp portions.

17. The grain loss apparatus of claim 14, wherein the ramp portion of each aperture of the plurality of apertures is a first ramp portion, and wherein each aperture of the plurality of apertures is at least partially defined by a second ramp portion extending downward from the grate panel toward the first end of the grate panel, wherein each second ramp portion is aligned with a respective first ramp portion such that the second ramp portion is positioned between the second end of the grate panel and the respective first ramp portion.

18. The grain loss apparatus of claim 17, further comprising a grain sensor having a sensing location positioned at a height below the grate, wherein the sensing location is a grain impinging surface of the grain sensor, and wherein the second ramp portions extends downward from the grate panel at an angle substantially perpendicular to the grain impinging surface of the grain sensor.

19. A grain harvesting vehicle configured to harvest a grain, the grain harvesting vehicle comprising:
a chaffer configured to separate grain from material other than grain (MOG);
a grate positioned rearward of the chaffer, the grate comprising:
a grate panel having an upper surface and a lower surface;
an aperture in the grate panel extending between the upper surface and the lower surface, the aperture having a first end nearer the chaffer and a second end opposite the first end; and
a ramp portion extending above the grate panel from adjacent the first end of the aperture toward the second end of the aperture;
a step pan fastened to the chaffer such that motion of the chaffer is transmittable to the step pan, wherein the grate is fastened to the step pan such that motion of the chaffer is transmittable to the grate; and
a grain sensor having a sensing location positioned at a height below the grate.

* * * * *